United States Patent
Rao et al.

(10) Patent No.: US 10,430,795 B2
(45) Date of Patent: Oct. 1, 2019

(54) RULES ENGINE FOR APPLYING RULES FROM A REVIEWING NETWORK TO SIGNALS FROM AN ORIGINATING NETWORK

(71) Applicant: MasterCard International Incorporated, Purchase, NY (US)

(72) Inventors: Prasad Krishnamoorthy Rao, Wildwood, MO (US); Jeffrey A. Bond, O'Fallon, MO (US); Russell W. Ball, Bridgeton, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 809 days.

(21) Appl. No.: 14/944,970

(22) Filed: Nov. 18, 2015

(65) Prior Publication Data
US 2017/0140378 A1    May 18, 2017

(51) Int. Cl.
*G06Q 20/40* (2012.01)
(52) U.S. Cl.
CPC ......... *G06Q 20/405* (2013.01); *G06Q 20/409* (2013.01)
(58) Field of Classification Search
CPC .. G06Q 20/405; G06Q 20/108; G06Q 20/023; G06Q 20/409
See application file for complete search history.

(56) References Cited

U.S. PATENT DOCUMENTS

| 5,708,422 A * | 1/1998 | Blonder ............... G06Q 20/40 340/5.41 |
| 7,231,657 B2 | 6/2007 | Honarvar et al. |
| 7,383,231 B2 | 6/2008 | Gupta et al. |

(Continued)

FOREIGN PATENT DOCUMENTS

WO    WO-2005033997 A1 *    4/2005    ............. G06Q 20/04

OTHER PUBLICATIONS

Bank Network News: The EFT aftershocks of the EDS disaster, Mar. 26, 1993, pp. 1-4 (Year: 1993).*

(Continued)

*Primary Examiner* — Bijendra K Shrestha
(74) *Attorney, Agent, or Firm* — Armstrong Teasdale LLP

(57) ABSTRACT

A rules engine for applying rules from a reviewing network to data signals from an originating network is described. The rules engine includes a processor coupled to a memory device. The rules engine is coupled to the reviewing network, and is configured to receive an authorization data signal from the originating network. The authorization data signal includes authorization data for at least one transaction that has been processed by the originating network. The originating network and the reviewing network are payment networks. Additionally, the rules engine generates an authorization response data signal that includes authorization response data by comparing the authorization data to the rules stored in the memory device. The authorization response data indicates whether the reviewing network authorizes or declines the at least one transaction included in the authorization data. The rules engine transmits the clearance response data signal to the originating network.

15 Claims, 10 Drawing Sheets

(56) References Cited

U.S. PATENT DOCUMENTS

| | | |
|---|---|---|
| 7,657,482 B1 | 2/2010 | Shirey et al. |
| 7,697,942 B2 | 4/2010 | Stevens |
| 7,729,994 B2 | 6/2010 | Gupta et al. |
| 7,962,415 B2 | 6/2011 | Gupta et al. |
| 7,962,419 B2 | 6/2011 | Gupta et al. |
| 8,150,768 B2 | 4/2012 | Gupta et al. |
| 8,150,769 B2 | 4/2012 | Gupta et al. |
| 8,229,854 B2 | 7/2012 | Stephen et al. |
| 8,600,873 B2 | 12/2013 | Fisher |
| 8,639,623 B2 | 1/2014 | Kavanagh et al. |
| 2003/0212629 A1* | 11/2003 | King ............... G06Q 20/04 705/39 |
| 2007/0288373 A1* | 12/2007 | Wilkes ............. G06Q 20/108 705/42 |
| 2010/0287099 A1* | 11/2010 | Liu ................. G06Q 20/40 705/44 |
| 2011/0016052 A1* | 1/2011 | Scragg ............. G06Q 20/02 705/44 |
| 2013/0073462 A1* | 3/2013 | Zanzot ............. G06Q 20/3223 705/44 |
| 2014/0074631 A1* | 3/2014 | Grossman .......... G06Q 20/0453 705/16 |
| 2014/0129435 A1* | 5/2014 | Pardo .............. G06Q 20/36 705/41 |
| 2014/0201079 A1 | 7/2014 | Kavanagh et al. |
| 2014/0279513 A1* | 9/2014 | Dodds-Brown ...... G06Q 20/10 705/44 |
| 2014/0304158 A1* | 10/2014 | Basu ............... G06Q 20/02 705/44 |
| 2014/0358789 A1* | 12/2014 | Boding ............ G06Q 20/4016 705/44 |
| 2015/0193743 A1* | 7/2015 | Simmons ........... G06Q 20/023 705/39 |
| 2015/0356562 A1* | 12/2015 | Siddens ........... G06O 20/4016 705/44 |
| 2016/0292663 A1* | 10/2016 | Sagan ............. G06Q 20/227 |

OTHER PUBLICATIONS

PR Newswire: Mosaic Software's Position Certfied to Support Hypercom's High-Speed Performance, Multi-Application Optimom L4100. Jun. 30, 2004, pp. 1-4. (Year: 2004).*

Chargerback911: MasterCard and Visa Chargeback Reason Codes, Mar. 11, 2015, Web archives, pp. 1-22 (Year: 2015).*

\* cited by examiner

RULES ENGINE FOR APPLYING RULES FROM A REVIEWING NETWORK TO SIGNALS FROM AN ORIGINATING NETWORK

BACKGROUND

This disclosure relates to processing electronic signals transmitted through computer networks, and more specifically to detecting data in signals received from an originating data network and determining whether aspects of the data comply with rules stored in an electronic database at a reviewing network.

At least some known payment processing networks perform a payment authorization process to determine whether to authorize or decline a financial transaction initiated by a cardholder using a payment card at a merchant location. The payment authorization process is performed by a payment processor within a payment network that facilitates communication between an issuer bank and a merchant bank. More specifically, the payment processing network communicates with a merchant bank computer system and an issuer bank computer system to determine whether the financial transaction should be authorized or declined based on a status of the cardholder's account.

On occasion, the payment processor cannot communicate with the issuer bank computer system because it is offline, the connection times out, or is otherwise unavailable. Because the payment authorization process is performed within a single payment network, rather than being distributed across multiple payment networks, if the issuer bank computer system cannot be contacted, the payment network declines the transaction and the cardholder cannot purchase the desired goods or services. Accordingly, if a payment network is restricted from performing the payment authorization process within a certain jurisdiction, for certain types of transactions, and/or for certain parties to the transactions, for example, due to governmental restrictions, a first payment network is unable to delegate the processes to a second payment network that is not subject to the same restrictions and oversee their performance by the second payment network.

BRIEF DESCRIPTION OF THE DISCLOSURE

In one aspect, a rules engine for applying rules from a reviewing network to data signals from an originating network is provided. The rules engine includes a processor coupled to a memory device. The rules engine is coupled to the reviewing network. The rules engine is configured to receive an authorization data signal from the originating network. The authorization data signal includes authorization data for at least one transaction that has been processed by the originating network. In at least some implementations, the originating network and the reviewing network are payment networks as described in more detail herein. Additionally, the rules engine generates an authorization response data signal that includes authorization response data by comparing the authorization data to the rules stored in the memory device. The authorization response data indicates whether the reviewing network authorizes or declines the at least one transaction included in the authorization data. Additionally, the rules engine transmits the authorization response data signal to the originating network.

In another aspect, a method for applying rules from a reviewing network to data signals from an originating network is provided. The method is implemented by a rules engine including a processor coupled to a memory device and to a payment network. The method includes receiving, by the rules engine, an authorization data signal from the originating network. The authorization data signal includes clearance data for at least one transaction that has been processed by the originating network. The originating network and the reviewing network are payment networks. The method additionally includes generating, by the rules engine, an authorization response data signal that includes authorization response data by comparing the authorization data to the rules stored in the memory device. The authorization response data indicates whether the reviewing network authorizes or declines the at least one transaction included in the authorization data. The method also includes transmitting, by the rules engine, the authorization response data signal to the originating network.

In yet another aspect, a computer-readable storage medium having computer-executable instructions embodied thereon for applying rules from a reviewing network to data signals from an originating network. When executed by a rules engine including a processor coupled to a memory device and to a processing network, the computer-executable instructions cause the rules engine to receive an authorization data signal from the originating network. The authorization data signal includes authorization data for at least one transaction that has been processed by the originating network. The originating network and the reviewing network are payment networks. Additionally, the instructions cause the rules engine to generate an authorization response data signal that includes clearance response data by comparing the authorization data to the set of predefined rules stored in the memory device. The authorization response data indicates whether the reviewing network authorizes or declines the at least one transaction included in the authorization data. Additionally, the instructions cause the rules engine to transmit the authorization response data signal to the originating network.

BRIEF DESCRIPTION OF THE DRAWINGS

FIG. 1 is a schematic diagram illustrating an enhanced multi-party payment card industry system for enabling payment-by-card transactions in which merchants and card issuers do not necessarily have a one-to-one relationship in a first payment processing network, and for receiving and analyzing electronic signals transmitted from a second payment processing network.

FIG. 2 is a simplified block diagram of an example payment processing system including a payment processing server computing device of a first payment processing network, a rules engine, a computing device of a second payment processing network, and a plurality of other client computing devices in accordance with one example embodiment of the present disclosure.

FIG. 3 is an expanded block diagram of a server architecture of the first payment processing system including the plurality of computing devices in accordance with one example embodiment of the present disclosure.

FIG. 4 illustrates a configuration of a client system shown in FIGS. 2 and 3 in accordance with one example embodiment of the present disclosure.

FIG. 5 illustrates a configuration of a server system shown in FIGS. 2 and 3 in accordance with one example embodiment of the present disclosure.

FIG. 6 is a diagram of electronic data signals received and transmitted among the first payment processing network, the second payment processing network, and the rules engine.

FIG. 7 is a diagram of rules that the rules engine applies to transaction data included in authorization data from the second payment processing network.

FIG. 8 is a diagram of clearance response data transmitted from the rules engine to the second payment processing network.

FIG. 9 is a flowchart of an example process implemented by the rules engine for applying rules from the first payment processing network to data signals from the second payment processing network in one example embodiment of the present disclosure.

FIG. 10 is a diagram of components of one or more example computing devices that may be used in the system shown in FIG. 2.

DETAILED DESCRIPTION OF THE DISCLOSURE

Figure 1:
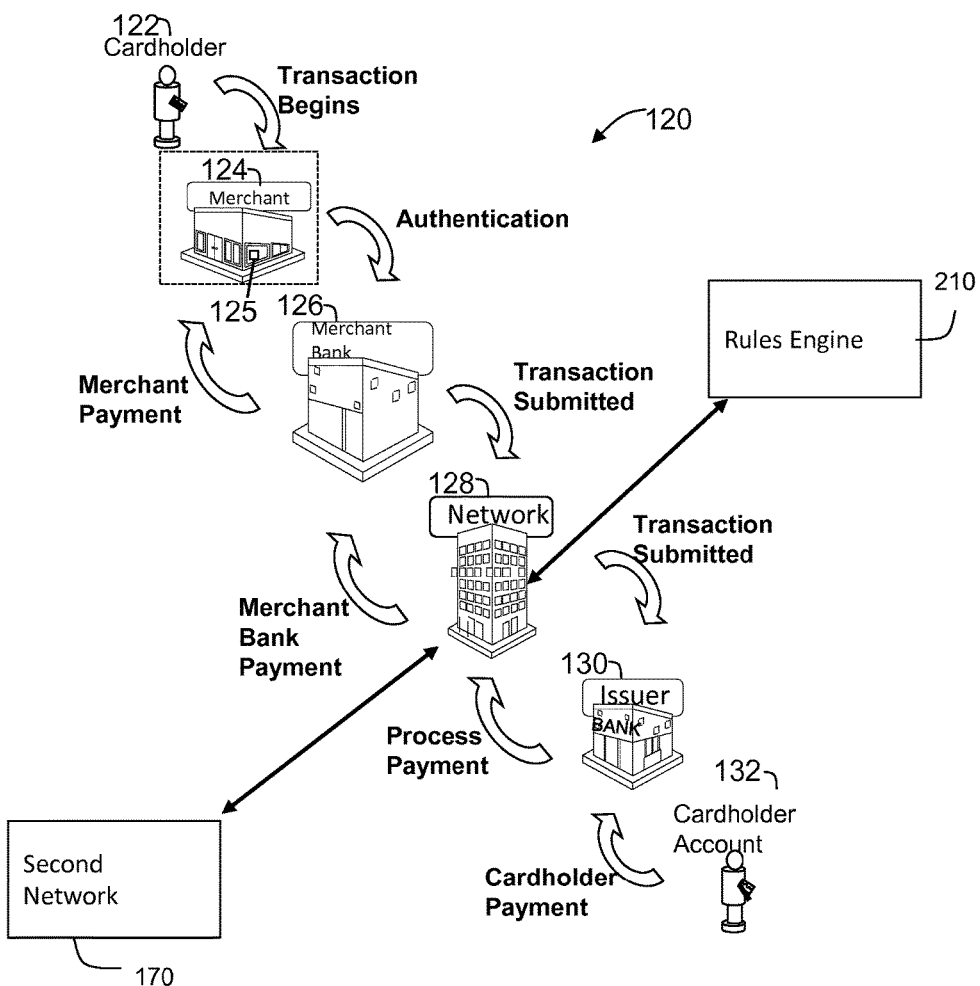
FIGS. 1-10 show example embodiments of the methods and systems described herein.

A rules engine for applying rules from a reviewing network to data signals from an originating network is provided. The rules engine includes a processor coupled to a memory device. The rules engine is coupled to the reviewing network. The rules engine is configured to receive an authorization data signal from the originating network. The authorization data signal includes authorization data for at least one transaction that has been processed by the originating network. In at least some implementations, the originating network and the reviewing network are payment networks as described in more detail herein. Additionally, the rules engine generates an authorization response data signal that includes authorization response data by comparing the authorization data to the rules stored in the memory device. The authorization response data indicates whether the reviewing network authorizes or declines the at least one transaction included in the authorization data. Additionally, the rules engine transmits the authorization response data signal to the originating network.

In some implementations, the rules engine retrieves the rules from the memory device. The rules are provided by an issuer bank associated with a payment card used to initiate the at least one transaction. The rules engine, in some embodiments, retrieves historical transaction data associated with the payment card from the memory device and applies the rules to the at least one transaction and the historical transaction data.

In some embodiments in which the authorization data includes a first monetary amount for a first transaction of the at least one transaction, the rules engine adds the first monetary amount to a cumulative transaction amount, and generates the authorization response data signal including a response code indicating whether the reviewing network authorizes or declines the first transaction based whether authorizing the first transaction would cause the cumulative transaction amount to exceed a predefined monetary limit over a predetermined time period.

In some implementations in which the authorization data includes a first monetary amount for a first transaction of the at least one transaction, the rules engine retrieves, from the memory device, historical transaction data associated with a payment card used to initiate the at least one transaction, and compares the first monetary amount and the historical transaction data to a predefined monetary limit for the payment card over a predefined period of time. The rules engine generates the authorization response data signal including a response code indicating whether the reviewing network authorizes or declines the first transaction based on whether authorizing the first transaction would cause the predefined monetary limit for the payment card over the predefined period of time to be exceeded.

In some embodiments, the rules engine retrieves, from the memory device, historical transaction data associated with a payment card used to initiate the at least one transaction and compares a transaction number amount included in the historical transaction data to a threshold transaction number limit over a predefined time period. The rules engine generates the authorization response data signal including a response code indicating whether the reviewing network authorizes or declines the at least one transaction based on whether authorizing the at least one transaction would cause the threshold transaction number limit over the predefined time period to be exceeded.

In some implementations, the rules engine receives the authorization data including a flag indicating that the originating network has requested stand-in authorization on behalf of an unavailable issuer bank computer system.

In some embodiments, the rules engine generates advice data including a response code and a reason code. The response code indicates an authorization or a decline of the transaction by the rules engine. The reason code indicates a reason for decline when the transaction is declined. The rules engine transmits the advice data to the originating network with the authorization response data signal.

The methods and systems described herein may be implemented using computer programming or engineering techniques including computer software, firmware, hardware or any combination or subset thereof, wherein the technical effect is achieved by performing at least one of: (a) receiving an authorization data signal from an originating network, the authorization data signal including authorization data for at least one transaction that has been processed by the originating network, wherein the originating network is a payment network; (b) generating a authorization response data signal including authorization response data by comparing the authorization data to rules stored in a memory device, wherein the authorization response data indicates whether the reviewing network authorizes or declines the at least one transaction included in the authorization data; and (c) transmitting the authorization response data signal to the originating network. The technical effects described herein apply to the technical field of processing electronic data signals transmitted through a computer network and determining whether data in the electronic data signals comply with predefined criteria. The systems and methods described herein provide the technical advantage of enabling a first processing network to offload data-processing functions to a second processing network that is communicatively coupled to the second processing network.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 120 for enabling payment-by-card transactions in which merchants and card issuers do not necessarily have a one-to-one relationship in a first payment processing network 128 ("reviewing network"), and for receiving and analyzing electronic signals transmitted from a second payment processing network 170 ("originating network"). The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution, such as an issuer 130, issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

In some implementations, issuer 130 may fail to respond to the authorization request. For example, the computers of issuer 130 may have a systematic malfunction or a connection to issuer 130 may be unavailable. In such implementations, second payment processing network 170 may have to request stand-in processing to make a decision on behalf of the authorization entity so that a timely authorization response may be provided to the merchant computer for the transaction. Second payment processing network 170 communicates with first payment processing network 128 to request stand-in processing for a transaction by rules engine 210.

The enhancement described herein enables first payment processing network 128 to receive and analyze electronic data signals from a second payment processing network 170, thereby enabling processing functions to be distributed across two networks. More specifically, and as described in more detail herein, a rules engine 210 coupled to first payment processing network 128 receives authorization data signals transmitted from second payment processing network 170 and determines whether authorization data within the electronic data signals comply with a set of rules stored in memory. If the authorization data does comply with the rules, then the first payment processing network stands-in for an unavailable issuer 130 and authorizes corresponding transactions represented in the authorization data. If the authorization data does not comply with the rules, the rules engine generates one or more error codes specifying why the first payment processing network 128 will not authorize the corresponding transactions.

Figure 2:
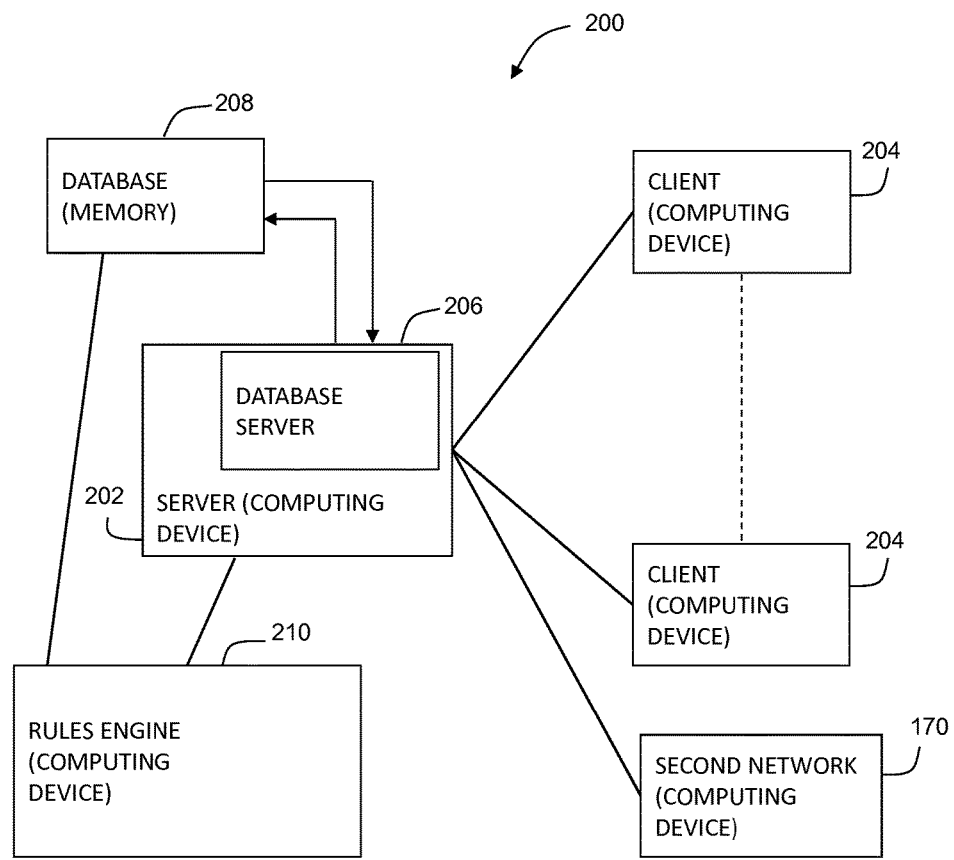

FIG. 2 is a simplified block diagram of an example payment processing system 200 in accordance with one embodiment of the present disclosure. In the example embodiment, system 200 includes a payment processing server computing device 202, a plurality of client subsystems 204 (also referred to as client systems or client computing devices) connected to payment processing server computing device 202, and a stand-in authorization server 210 (referred to herein as rules engine 210). In one embodiment, client systems 204 are computers including a web browser, such that payment processing server computing device 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a mobile computing device, such as a notebook computer, a web-based phone, a personal digital assistant (PDA), or other web-connectable equipment. In one embodiment, client computing device 204 includes a 3$^{rd}$ party payment network computing device, a point-of-sale (POS) device, a cardholder computing device (e.g., a smartphone, a tablet, or other computing device), or any other computing device capable of communicating with payment processing server computing device 202.

A database server 206 is connected to a database 208 containing information on a variety of matters, as described below in greater detail. In one embodiment, database 208 is stored on payment processing server computing device 202 and may be accessed by potential users at one of client systems 204 by logging onto payment processing server computing device 202 through one of client systems 204. In an alternative embodiment, database 208 is stored remotely from payment processing server computing device 202 and may be non-centralized.

Figure 3:
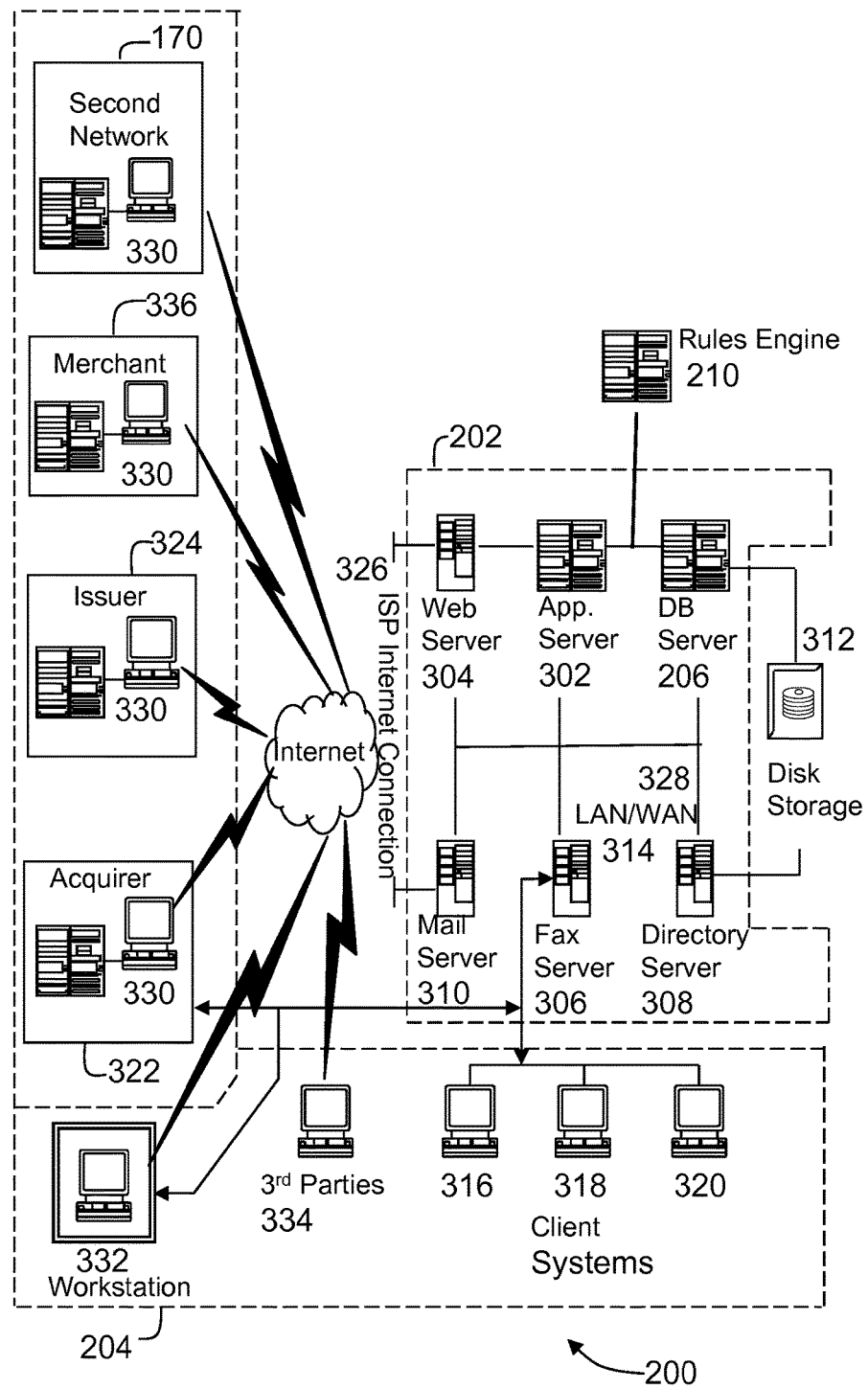

FIG. 3 is an expanded block diagram of an example embodiment of a server architecture of payment processing system 200 in accordance with one embodiment of the present disclosure. Payment processing system 200 includes payment processing server computing device 202, client systems 204, and rules engine 210. Payment processing server computing device 202 includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet. In some embodiments, rules engine 210 is remote from payment processing server computing device 202, but is communicatively coupled thereto. In other embodiments, rules engine 210 is incorporated into payment processing server computing device 202.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Payment processing server computing device 202 is configured to be communicatively coupled to various entities, including acquirers 322 and issuers 324, and to third parties 334 (e.g., auditors) using an Internet connection 326. Server system 202 is also communicatively coupled with one or more merchants 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328. As described above, in some implementations, rules engine 210 is remote from payment processing server computing device 202, but is communicatively coupled thereto. In other implementations, rules engine 210 is incorporated into payment processing server computing device 202.

In the example embodiment, any authorized individual or entity having a workstation 330 may access system 200. At least one of the client systems includes a manager workstation 332 located at a remote location. Workstations 330 and 332 include personal computers having a web browser. Furthermore, fax server 306 communicates with remotely located client systems, including a client system 332, using a telephone link. Fax server 306 is configured to communicate with other client systems 316, 318, and 320 as well.

Figure 4:
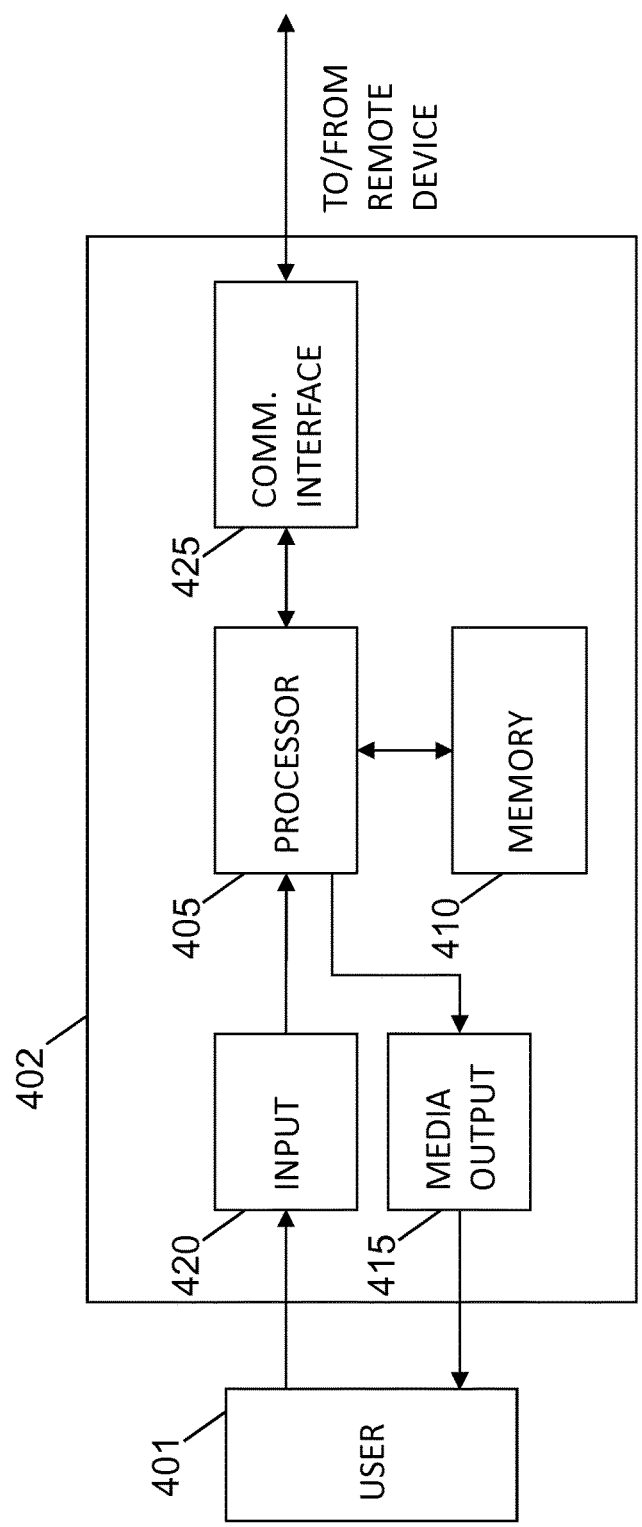

FIG. 4 illustrates an example configuration of a client computing device 402. Client computing device 402 may include, but is not limited to, client systems ("client computing devices") 204, 316, 318, and 320, workstation 330, manager workstation 332, and third party computing devices 334 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information to user 401. In some embodiments, media output component 415 includes an output adapter such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively coupleable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server associated with a merchant. A client application allows users 401 to interact with a server application associated with, for example, a merchant.

Figure 5:
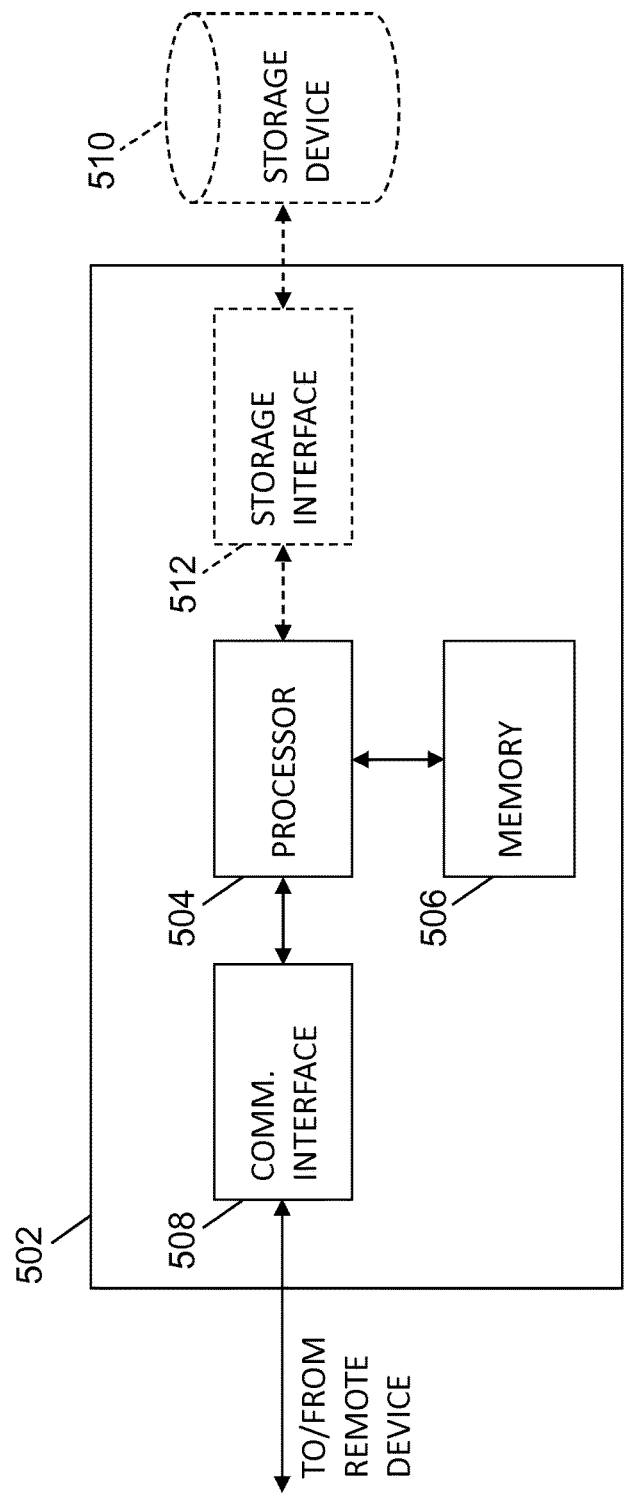

FIG. 5 illustrates an example configuration of a server computing device 502. Server computing device 502 is representative of payment processing server computing device 202 (shown in FIGS. 2 and 3), database server 206, application server 302, web server 304, fax server 306, directory server 308, mail server 310, and one or more computing devices included in rules engine 210.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
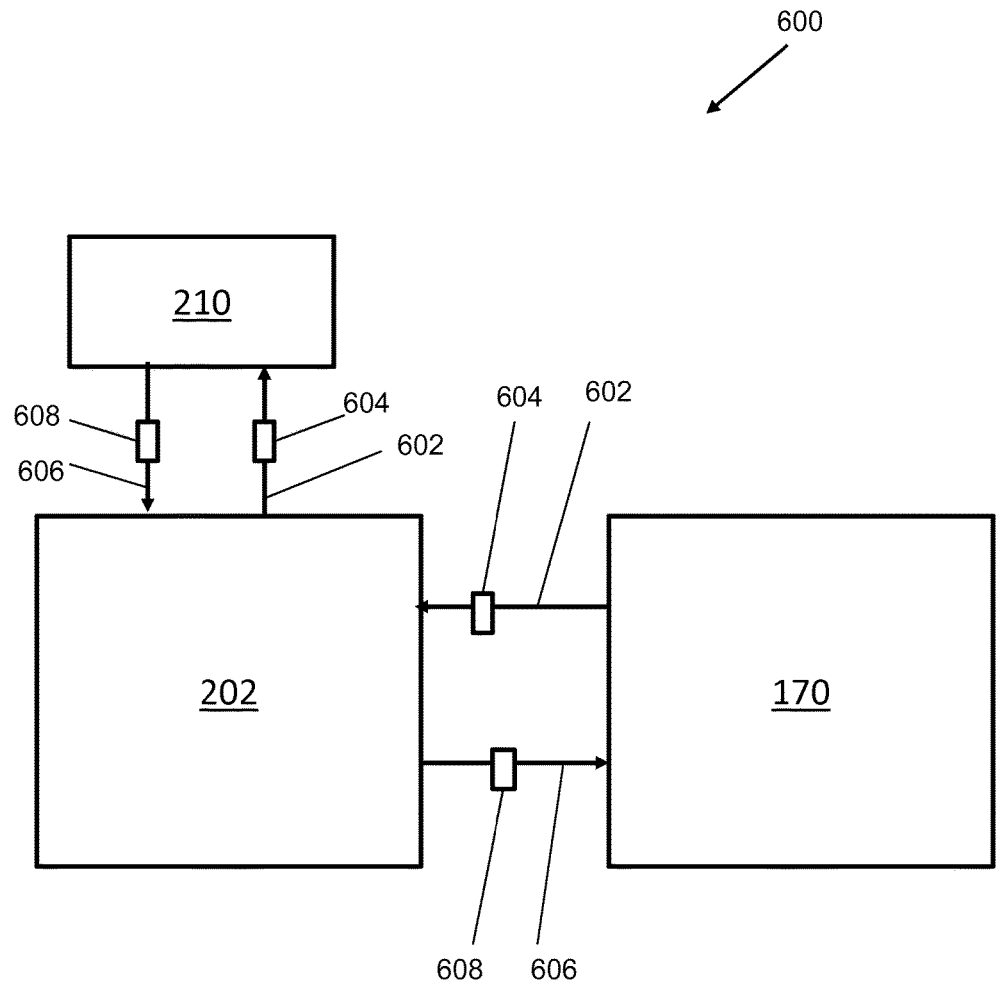

FIG. 6 is a diagram 600 of electronic data signals received and transmitted among the payment processing server computing device 202 of first payment processing network 128, the second payment processing network 170, and the rules engine 210. In the example embodiment, when second payment processing network 170 ("originating network") is processing a transaction and an issuer of the payment card used to initiate the transaction fails to respond to an authorization data signal transmitted by second payment processing network 170, stand-in authorization by first payment processing network 128 (the "reviewing network") may be requested. The issuer may be unavailable because, for example, the issuer's computers have a systematic malfunction or a connection to the issuer is unavailable. In such embodiments, second payment processing network 170 requests that first payment processing network 128 perform stand-in authorization on behalf of the unavailable issuer so that a timely authorization response may be provided for the transaction.

More specifically, in the example embodiment, second payment processing network 170 transmits an authorization data signal 602 to payment processing server computing device 202. Authorization data signal 602 includes authorization data 604, representing one or more transactions processed by second payment processing network 170. More specifically, authorization data 604 includes data regarding financial transactions made, for example, between merchants and cardholders, as described above with reference to FIG. 1. For certain transactions in the authorization data 604, first payment processing network 128 will authorize the transaction, based on information in the authorization data 604 and a set of rules applied by rules engine 210. For other transactions, first payment processing network 128 will not provide authorization, because one or more aspects of the transactions are not in compliance with the rules applied by rules engine 210. Payment processing server computing device 202 transmits authorization data signal 602 and authorization data 604 to rules engine 210 for analysis. As described above, in some implementations, rules engine 210 is separate from and communicatively coupled to payment processing server computing device 210 and in other implementations, rules engine 210 is incorporated into payment processing server computing device 202.

Rules engine 210 applies stored rules to authorization data 604 as described in more detail with reference to FIG. 7, and generates an authorization response data signal 606 that includes authorization response data 608. Authorization response data 608 includes identifiers of transactions for which first payment processing network 128 will not authorize and error codes identifying reasons why the transaction will not be authorized, as described in more detail with reference to FIG. 8. Rules engine 210 transmits authorization response data signal 606 including authorization response data 608 to second payment processing network 170. In some implementations, rules engine 210 transmits authorization response data signal 606 to second payment processing network 170 by transmitting authorization response data signal 606 to payment processing server computing device 202, which in turn, transmits authorization response data signal 606 to second payment processing network 170. In other embodiments, rules engine 210 transmits authorization response data signal 606 directly to second payment processing network 170.

In the example embodiment, as part of authorization response data 608, rules engine 210 is further configured to generate advice data including a response code and a reason code. The response code indicates an authorization or a decline of the transaction by rules engine 210. The reason code indicates a reason for the decline when the transaction is declined. Rules engine 210 transmits the advice data to first payment processing network 128 as part of authorization response data signal 604. For example, if rules engine 210 declines a transaction because of an invalid personal identification number (PIN), the advice data would include a response code indicating that the transaction was declined and a reason code indicating that it was declined because of a failed PIN validation. In some embodiments, the response code may further indicate whether any additional services were performed by reviewing network 134. If services were performed, the reason code indicates which services were performed (i.e., fraud risk service, chip validation, AAC validation, dynamic CVC1 validation, PIN validation, etc.)

Second payment processing network 170 receives authorization response data signal 606, including the advice data, and transmits an authorization data signal to acquirer 126 indicating whether the transaction is approved or declined. Acquirer 126 forwards the authorization data signal to merchant 124, where the transaction is either completed or cancelled.

Once originating payment network 128 is able to make contact with issuer 130, originating payment network 128 transmits a stand-in transaction data signal to the issuer. The stand-in transaction data signal includes stand-in transaction data for the stand-in authorization performed on the transaction. The stand-in transaction data includes the transaction details, the authorization response, and the advice data including the response code and the reason code. The issuer uses the stand-in transaction data to update cardholder's account 132 (shown in FIG. 1).

Figure 7:
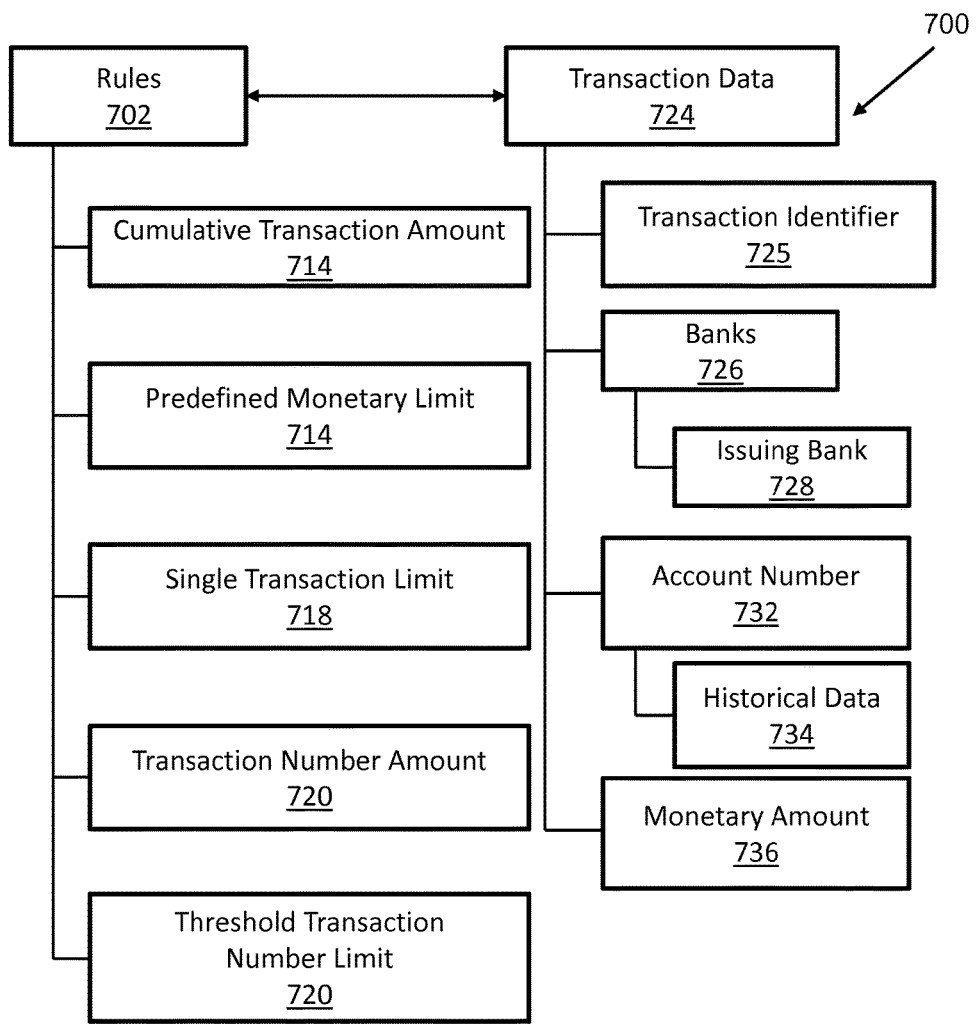

FIG. 7 is a diagram 700 including rules that the rules engine 210 applies to transaction data 724 included in authorization data 604 from the second payment processing network 170. More specifically, authorization data 604 includes transaction data 724 for one transaction or, in some implementations, a plurality of transactions (a "batch"). Rules 702 are stored in memory, for example database 208, and are accessed by rules engine 210. Rules 702 are specifically defined for each issuer and specify when first payment processing network 128 should authorize or decline a stand-in transaction on behalf of an unavailable issuer. For example, in some implementations, rules engine 210 detects that a bank 726, such as an issuing bank 728 is identified in a transaction, for example a transaction identified in authorization data 604 by a transaction identifier 725, as a party to the transaction. Based on that identification, rules engine 210 retrieves rules 702 associated with issuing bank 728 to apply to the transaction. Rules engine 210 also detects an account number 732 in the transaction data 724 and retrieves historical transaction data 734 associated with account number 732. Historical transaction data 734 includes, at least in part, a date of each transaction, the number of transactions initiated using the payment card, and a monetary amount of each transaction. Rules engine 210 applies rules 702 to historical transaction data 734 to determine whether to authorize or decline a stand-in transaction on behalf of an unavailable issuer.

For example, in one implementation, rules 702 include a cumulative transaction amount 714 (e.g., cumulative monetary amounts) over a predetermined time period that cannot be exceeded. For example, rules engine 210 detects a monetary amount 736 stored in association with transaction identifier 725 in transaction data 724 and adds the monetary amount 736 to cumulative transaction amount 714. Rules engine 210 compares cumulative transaction amount 714 over the predetermined time period (i.e., one day, one week, one month, etc.) to a predefined monetary limit 716 for the predetermined time period. When rules engine 210 determines that authorizing the transaction of monetary amount 736 would cause cumulative transaction amount 714 over the predetermined time period to exceed predefined monetary limit 716, rules engine 210 declines the transaction. Alternatively, when rules engine 210 determines that authorizing the transaction of monetary amount 736 would not cause cumulative transaction amount 714 over the predetermined time period to exceed predefined monetary limit 716, rules engine 210 authorizes the transaction.

In another implementation, rules 702 include a single transaction limit 718 that cannot be exceeded. For example, rules engine 210 detects monetary amount 736 stored in association with transaction identifier 725 in transaction data 724 and compares monetary amount 736 to single transaction limit 718. When rules engine 210 determines that monetary amount 736 is greater than single transaction limit 718, rules engine 210 declines the transaction. Alternatively, when rules engine 210 determines that monetary amount 734 is lower than single transaction limit 718, rules engine 210 authorizes the transaction.

In another implementation, rules 702 include a transaction number amount 720 for a predetermined time period that cannot be exceeded. For example, rules engine 210 detects account number 732 associated with the transaction and adds a value of one to transaction number amount 720. Rules engine 210 compares transaction number amount 720 for the predetermined time period to a threshold transaction number limit 722 for the predetermined time period. When rules engine 210 determines that authorizing the transaction would cause transaction number amount 720 to exceed threshold transaction number limit 722 over the predetermined time period, rules engine 210 declines the transaction. Alternatively, when rules engine 210 determines that authorizing the transaction would not cause transaction number amount 720 to exceed threshold transaction number limit 722 over the predetermined time period, rules engine 210 authorizes the transaction.

Figure 8:
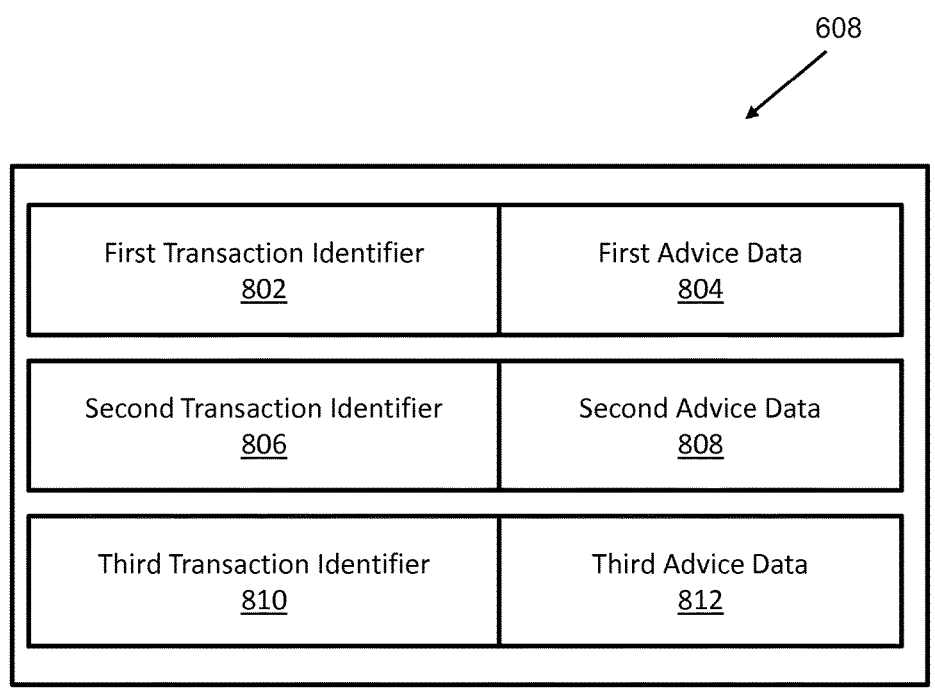

FIG. 8 is a diagram of authorization response data 608 transmitted from the rules engine 210 to second payment processing network 170. Authorization response data 608 includes a first transaction identifier 802, for example transaction identifier 725 (FIG. 7), and first advice data 804 including a response code indicating authorization or decline of a first transaction identified by first transaction identifier 802, and a reason code indicating a reason for decline when the transaction is declined. For example, first advice data 804 may indicate that the first transaction is declined because authorizing the first transaction would cause cumulative transaction amount 714 over the predetermined time period to exceed predefined monetary limit 716.

Authorization response data 608 also includes a second transaction identifier 806 associated with a second transaction that was represented in authorization data 604. Authorization response data 608 includes second advice data 808 that is associated with second transaction identifier 806. For example, second advice data 808 may indicate that the second transaction is authorized because the monetary amount 734 of the transaction is lower than single transaction limit 718.

Additionally, authorization response data 608 includes a third transaction identifier 810 associated with a third transaction that was represented in authorization data 604 and associated third advice data 812. Third advice data 812 may indicate, for example, that rules engine 210 declines the third transaction because authorizing the third transaction would cause a transaction number amount 720 over a predetermined time period to exceed a threshold transaction number limit 738 over the predetermined time period.

In some implementations, authorization response data 608 only includes data (e.g., transaction identifiers and response/reason codes) associated with transactions that the first payment processing network 128 authorized or declined by stand-in authorization. In other implementations, authorization response data 608 includes transaction identifiers and corresponding codes for transactions that the first payment processing network 128 authorized or declined by stand-in authorization.

Figure 9:
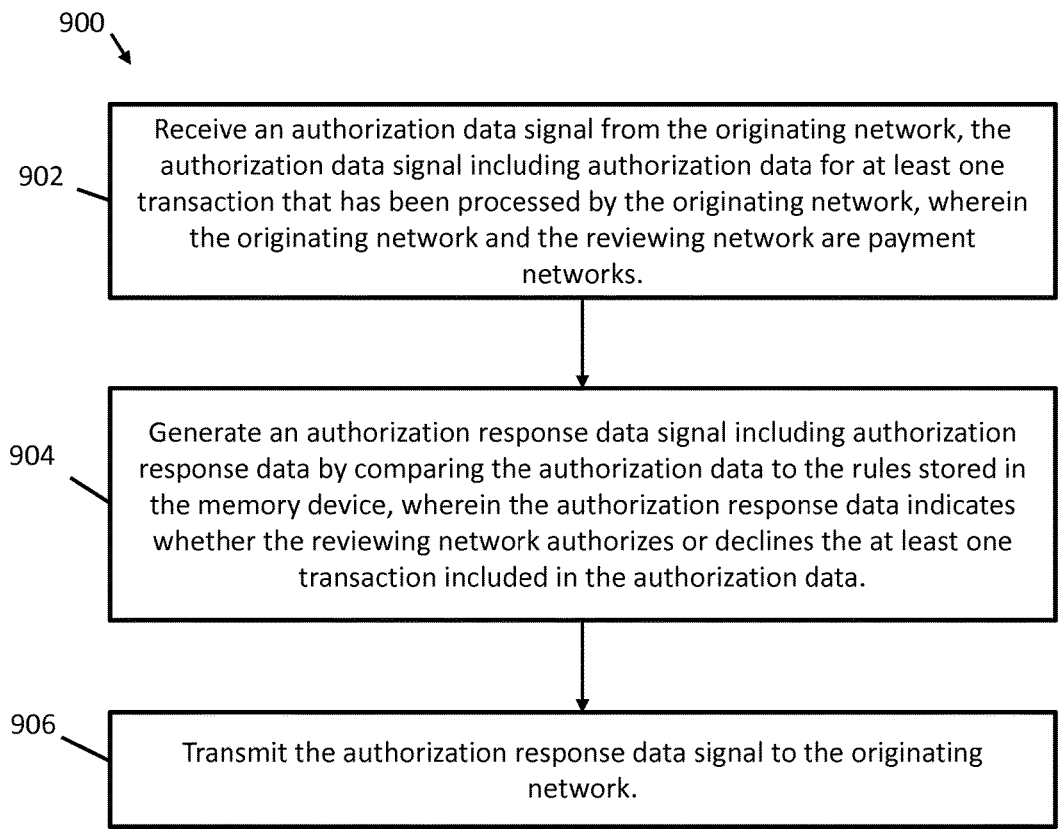

FIG. 9 is a flowchart of an example process 900 implemented by the rules 210 engine for applying rules 702 from the first payment processing network 128 to data signals (e.g., authorization data signals 602) from the second payment processing network 170. Initially, rules engine 210 receives 902 an authorization data signal (e.g., authorization data signal 602) from an originating network (e.g., second payment processing network 170). The authorization data signal 602 includes authorization data (e.g., authorization data 604) for at least one transaction that has been processed by the originating network (e.g., second payment processing network 170). The originating network (e.g., payment processing network 170) and the reviewing network (e.g., first payment processing network 128) are payment networks. In some implementations, the originating network is unable to contact and issuer bank computer system during processing of the transaction and requests the reviewing network to perform stand-in processing of the transaction.

Additionally, rules engine 210 generates 904 an authorization response data signal (e.g., authorization response data signal 606) that includes authorization response data (e.g., authorization response data 608) by comparing the authorization data (e.g., authorization data 604) to a set of predefined rules (e.g., rules 702) stored in a memory device (e.g., database 208). The authorization response data (e.g., authorization response data 608) indicates that the reviewing network (e.g., first payment processing network 128) authorizes or declines the at least one transaction included in the authorization data (e.g., authorization data 604).

Moreover, rules engine 210 transmits 906 the authorization response data signal (e.g., authorization response data signal 606) to the originating network (e.g., second payment processing network 170).

In some implementations, rules engine 210 retrieves the rules from memory device 208. The rules are provided by an issuer bank associated with a payment card used to initiate the at least one transaction. Rules engine 210, in some embodiments, retrieves historical transaction data associated with the payment card from memory device 208 and applies the rules to the at least one transaction and the historical transaction data.

In some embodiments in which the authorization data includes a first monetary amount for a first transaction of the at least one transaction, rules engine 210 adds the first monetary amount to a cumulative transaction amount, and generates the authorization response data signal including a response code indicating whether the reviewing network authorizes or declines the first transaction based whether authorizing the first transaction would cause the cumulative transaction amount to exceed a predefined monetary limit over a predetermined time period.

In some implementations in which the authorization data includes a first monetary amount for a first transaction of the at least one transaction, rules engine 210 retrieves, from the memory device, historical transaction data associated with a payment card used to initiate the at least one transaction, and compares the first monetary amount and the historical transaction data to a predefined monetary limit for the payment card over a predefined period of time. Rules engine 210 generates the authorization response data signal including a response code indicating whether the reviewing network authorizes or declines the first transaction based on whether authorizing the first transaction would cause the predefined monetary limit for the payment card over the predefined period of time to be exceeded.

In some embodiments, rules engine 210 retrieves, from memory device 208, historical transaction data associated with a payment card used to initiate the at least one transaction and compares a transaction number amount included in the historical transaction data to a threshold transaction number limit over a predefined time period. Rules engine 210 generates the authorization response data signal including a response code indicating whether the reviewing network authorizes or declines the at least one transaction based on whether authorizing the at least one transaction would cause the threshold transaction number limit over the predefined time period to be exceeded.

In some implementations, rules engine 210 receives the authorization data including a flag indicating that the originating network has requested stand-in authorization on behalf of an unavailable issuer bank computer system.

In some embodiments, rules engine 210 generates advice data including a response code and a reason code. The response code indicates an authorization or a decline of the transaction by rules engine 210. The reason code indicates a reason for decline when the transaction is declined. The rules engine transmits the advice data to the originating network with the authorization response data signal.

Figure 10:
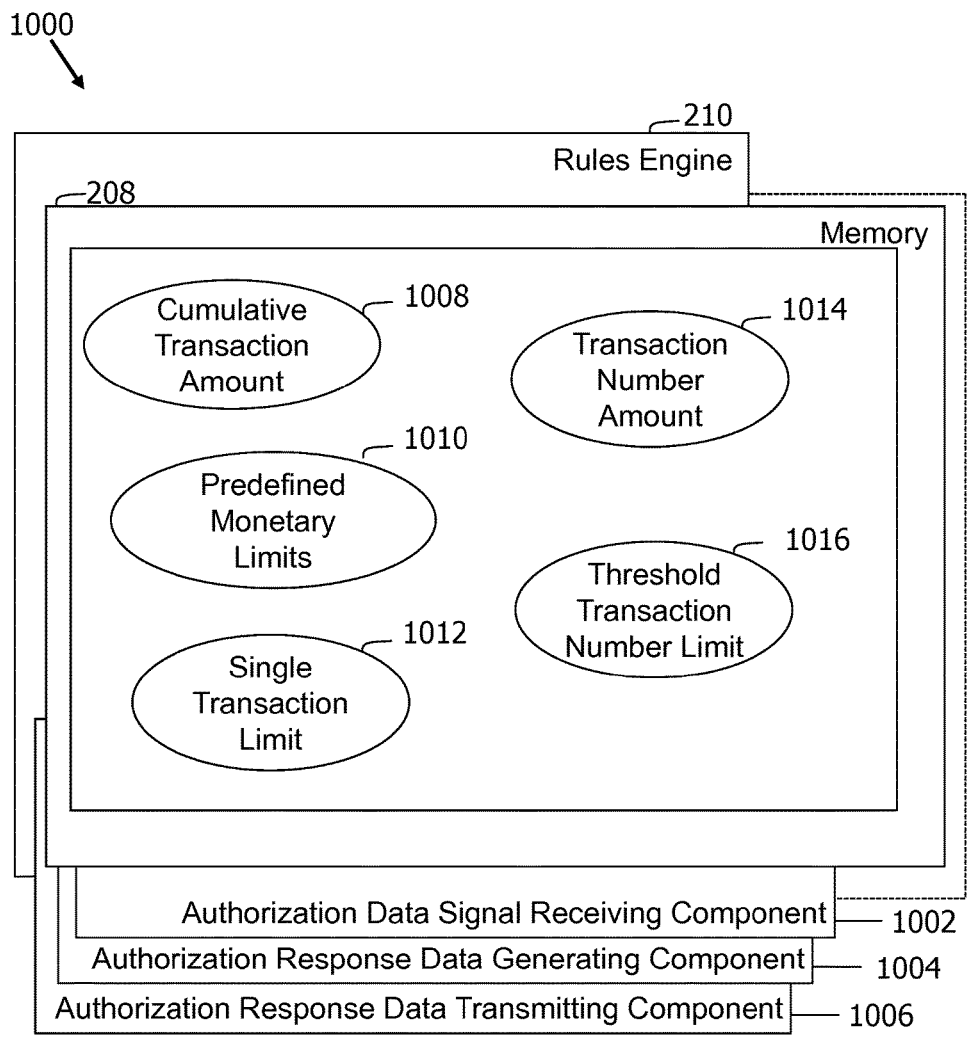

FIG. 10 is a diagram 1000 of components of one or more example computing devices, for example rules engine 210, that may be used in embodiments of the described systems and methods. FIG. 10 further shows a configuration of data in database 208. Database 208 is in communication with several separate components within rules engine 210, which perform specific tasks.

Rules engine 210 includes an authorization data signal receiving component 1002 that receives an authorization data signal from the originating network. The authorization data signal includes authorization data for at least one transaction that has been processed by the originating network. Additionally, rules engine 210 includes an authorization response data generating component 1004 that generates an authorization response data signal that includes authorization response data. More specifically, authorization response data generating component 1004 compares the authorization data to the set of predefined rules stored in the memory device (e.g., database 208). The authorization response data indicates whether the reviewing network authorizes or declines the at least one transaction included in the authorization data. Further, rules engine 210 includes an authorization response data transmitting component 1006 that transmits the authorization response data signal to the originating network.

In an example embodiment, data in database 208 is divided into a plurality of sections, including but not limited to, a cumulative transaction amount section 1008, a predefined monetary limits section 1010, a single transaction limit section 1012, a transaction number amount section 1014, and a threshold transaction number limit section 1016. These sections stored in database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described systems and methods enable distributed evaluation of data across two payment networks. More specifically, the systems and methods described herein provide settlement guarantee on a risk-sensitive basis when a second network operates with a first network manage one or more payment processing functions, for example clearing of transactions. Accordingly, the systems and methods described herein enable the first network to evaluate clearing transactions from the second network prior to settlement being effected.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A rules engine for applying rules for a reviewing network to data signals from an originating network, the data signals associated with a transaction, said rules engine comprises a processor communicatively coupled to a memory device, said rules engine is communicatively coupled to the reviewing network, said rules engine is configured to:
   store the rules within said memory device, wherein the rules are provided on behalf of an issuer bank that issued a payment card to a cardholder that is used to initiate the transaction, the issuer bank being associated with an issuer computer system, the issuer computer system in communication with the originating network;
   receive an authorization data signal from the originating network when the issuer computer system fails to respond to the authorization data signal transmitted by the originating network and the issuer computer system is determined to be unavailable to authorize the transaction, the authorization data signal including authorization data for the transaction processed by the originating network and a stand-in authorization request message including a flag requesting that the reviewing network perform stand-in authorization for the transaction on behalf of the unavailable issuer computer system associated with the originating network, wherein the originating network and the reviewing network are separate payment networks;
   identify the unavailable issuer bank based on a transaction identifier and retrieve the rules associated with the unavailable issuer bank from said memory device after receiving the authorization data signal;
   detect an account identifier associated with the transaction in the authorization data signal;
   retrieve historical transaction data associated with the detected account identifier from said memory device;
   generate, by said rules engine, an authorization response data signal including authorization response data by comparing the authorization data to the rules associated with the unavailable issuer bank stored in said memory device and applying the rules to the retrieved historical transaction data, wherein the authorization response data indicates whether the reviewing network authorizes or declines the transaction included in the authorization data on behalf of the issuer bank; and
   transmit the authorization response data signal to the originating network.

2. The rules engine of claim 1, wherein the authorization data includes a first monetary amount for a first transaction of the transaction, said rules engine is further configured to:
   add the first monetary amount to a cumulative transaction amount; and generate the authorization response data signal including a response code indicating whether the reviewing network authorizes or declines the first transaction based on whether authorizing the first transaction would cause the cumulative transaction amount to exceed a predefined monetary limit over a predetermined time period.

3. The rules engine of claim 1, wherein the authorization data includes a first monetary amount for a first transaction of the transaction, said rules engine is further configured to:
compare the first monetary amount and the historical transaction data to a single transaction limit for the payment card; and
generate the authorization response data signal including a response code indicating whether the reviewing network authorizes or declines the first transaction based on whether authorizing the first transaction would cause the single transaction limit for the payment card to be exceeded.

4. The rules engine of claim 1, further configured to:
compare a transaction number amount included in the historical transaction data to a threshold transaction number limit over a predefined time period; and
generate the authorization response data signal including a response code indicating whether the reviewing network authorizes or declines the transaction based on whether authorizing the transaction would cause the threshold transaction number limit over the predefined time period to be exceeded.

5. The rules engine of claim 1, wherein to generate the authorization response data signal, said rules engine is further configured to:
generate advice data including a response code indicating one of an authorization and a decline of the transaction by said rules engine, and a reason code indicating a reason for decline when the transaction is declined; and
transmit the advice data to the originating network with the authorization response data signal.

6. A method for applying rules for a reviewing network to data signals from an originating network, the data signals associated with a transaction, said method is implemented by a rules engine including a processor communicatively coupled to a memory device and to a payment network, said method comprising:
storing the rules within the memory device, wherein the rules are provided on behalf of an issuer bank that issued a payment card to a cardholder that is used to initiate the transaction, the issuer bank being associated with an issuer computer system, the issuer computer system in communication with the originating network;
receiving, by the rules engine, an authorization data signal from the originating network when the issuer computer system fails to respond to the authorization data signal transmitted by the originating network and the issuer computer system is determined to be unavailable to authorize the transaction, the authorization data signal including authorization data for the transaction processed by the originating network and a stand-in authorization request message including a flag requesting that the reviewing network perform stand-in authorization for the transaction on behalf of the unavailable issuer computer system associated with the originating network, wherein the originating network and the reviewing network are separate payment networks;
identifying the unavailable issuer bank based on a transaction identifier and retrieving the rules associated with the unavailable issuer bank from the memory device after receiving the authorization data signal;
detecting an account identifier associated with the transaction in the authorization data signal;
retrieving historical transaction data associated with the detected account identifier from the memory device;
generating, by the rules engine, an authorization response data signal including authorization response data by comparing the authorization data to the rules associated with the unavailable issuer bank stored in the memory device and applying the rules to the retrieved historical transaction data, wherein the authorization response data indicates whether the reviewing network authorizes or declines the transaction included in the authorization data on behalf of the issuer bank; and
transmitting, by the rules engine, the authorization response data signal to the originating network.

7. The method of claim 6, wherein the authorization data includes a first monetary amount for a first transaction of the transaction, said method further comprising:
adding the first monetary amount to a cumulative transaction amount; and
generating the authorization response data signal including a response code indicating whether the reviewing network authorizes or declines the first transaction based on whether authorizing the first transaction would cause the cumulative transaction amount to exceed a predefined monetary limit over a predetermined time period.

8. The method of claim 6, wherein the authorization data includes a first monetary amount for a first transaction of the transaction, said method further comprising:
comparing the first monetary amount and the historical transaction data to a single transaction limit for the payment card; and
generating the authorization response data signal including a response code indicating whether the reviewing network authorizes or declines the first transaction based on whether authorizing the first transaction would cause the single transaction limit for the payment card to be exceeded.

9. The method of claim 6, further comprising:
comparing a transaction number amount included in the historical transaction data to a threshold transaction number limit over a predefined time period; and
generating the authorization response data signal including a response code indicating whether the reviewing network authorizes or declines the transaction based on whether authorizing the transaction would cause the threshold transaction number limit over the predefined time period to be exceeded.

10. The method of claim 6, wherein to generate the authorization response data signal, said method further comprises:
generating advice data including a response code indicating one of an authorization and a decline of the transaction by the rules engine, and a reason code indicating a reason for decline when the transaction is declined; and
transmitting the advice data to the originating network with the authorization response data signal.

11. A non-transitory computer-readable storage medium having computer-executable instructions embodied thereon for applying rules for a reviewing network to data signals from an originating network, the data signals associated with a transaction, wherein when executed by a rules engine including a processor coupled to a memory device and to a processing network, the computer-executable instructions cause the rules engine to:
  store the rules within the memory device, wherein the rules are provided on behalf of an issuer bank that issued a payment card to a cardholder that is used to initiate the transaction, the issuer bank being associated with an issuer computer system, the issuer computer system in communication with the originating network;
  receive an authorization data signal from the originating network when the issuer computer system fails to respond to the authorization data signal transmitted by the originating network and the issuer computer system is determined to be unavailable to authorize the transaction, the authorization data signal including authorization data for the transaction processed by the originating network and a stand-in authorization request message including a flag requesting that the reviewing network perform stand-in authorization for the transaction on behalf of the unavailable issuer computer system associated with the originating network, wherein the originating network and the reviewing network are separate payment networks;
  identify the unavailable issuer bank based on a transaction identifier and retrieve the rules associated with the unavailable issuer bank from the memory device after receiving the authorization data signal;
  detect an account identifier associated with the transaction in the authorization data signal;
  retrieve historical transaction data associated with the detected account identifier from the memory device;
  generate, by the rules engine, an authorization response data signal including authorization response data by comparing the authorization data to the rules associated with the unavailable issuer bank stored in the memory device and applying the rules to the retrieved historical transaction data, wherein the authorization response data indicates whether the reviewing network authorizes or declines the transaction included in the authorization data on behalf of the issuer bank; and
  transmit the authorization response data signal to the originating network.

12. The non-transitory computer-readable storage medium of claim 11, wherein the authorization data includes a first monetary amount for a first transaction of the transaction, said computer-readable instructions additionally cause the rules engine to:
  add the first monetary amount to a cumulative transaction amount; and
  generate the authorization response data signal including a response code indicating whether the reviewing network authorizes or declines the first transaction based on whether authorizing the first transaction would cause the cumulative transaction amount to exceed a predefined monetary limit over a predetermined time period.

13. The non-transitory computer-readable storage medium of claim 11, wherein the authorization data includes a first monetary amount for a first transaction of the transaction, said computer-readable instructions additionally cause the rules engine to:
  compare the first monetary amount and the historical transaction data to a single transaction limit for the payment card; and
  generate the authorization response data signal including a response code indicating whether the reviewing network authorizes or declines the first transaction based on whether authorizing the first transaction would cause the single transaction limit for the payment card to be exceeded.

14. The non-transitory computer-readable storage medium of claim 11, wherein said computer-readable instructions additionally cause the rules engine to:
  compare a transaction number amount included in the historical transaction data to a threshold transaction number limit over a predefined time period; and
  generate the authorization response data signal including a response code indicating whether the reviewing network authorizes or declines the transaction based on whether authorizing the transaction would cause the threshold transaction number limit over the predefined time period to be exceeded.

15. The non-transitory computer-readable storage medium of claim 11, wherein to generate the authorization response data signal, said computer-readable instructions additionally cause the rules engine to:
  generate advice data including a response code indicating one of an authorization and a decline of the transaction by the rules engine, and a reason code indicating a reason for decline when the transaction is declined; and
  transmit the advice data to the originating network with the authorization response data signal.

* * * * *